United States Patent [19]
Brixy et al.

[11] 3,818,761
[45] June 25, 1974

[54] SYSTEM FOR MEASURING TEMPERATURES

[75] Inventors: Heinz Brixy; Klaus-Jürgen Gärtner, both of Julich, Germany

[73] Assignee: Kernforschungsanlage Julich GmbH, Julich, Germany

[22] Filed: Mar. 28, 1972

[21] Appl. No.: 238,833

[30] Foreign Application Priority Data
Mar. 29, 1971 Germany............................ 2115029

[52] U.S. Cl. ............................. 73/359, 73/362 AR
[51] Int. Cl. ............................................. G01k 7/30
[58] Field of Search ......... 73/359, 362 AR, 362 SC; 235/193.5, 194; 328/144

[56] References Cited
UNITED STATES PATENTS
2,710,899   6/1955   Marsden et al. ................ 73/362 AR
2,728,836   12/1955  De Boisblanc...................... 73/359
2,768,266   10/1956  Marsden .............................. 73/359
2,884,786   5/1959   Burk ................................... 73/359

Primary Examiner—Richard C. Queisser
Assistant Examiner—Denis F. Corr
Attorney, Agent, or Firm—Karl F. Ross; Herbert Dubno

[57] ABSTRACT

A system for measuring temperatures using the thermal-noise electrical output of a conductive element in which a reference resistor and the conductive element are connected by a sampling switch arrangement to an amplifier provided with a filter whose band width or characteristic pass frequency corresponds to the noise-voltage frequency. The output of the latter is applied to a multiplier and the latter supplies the output stage via a commutating switch synchronized with the sampling switch.

10 Claims, 2 Drawing Figures

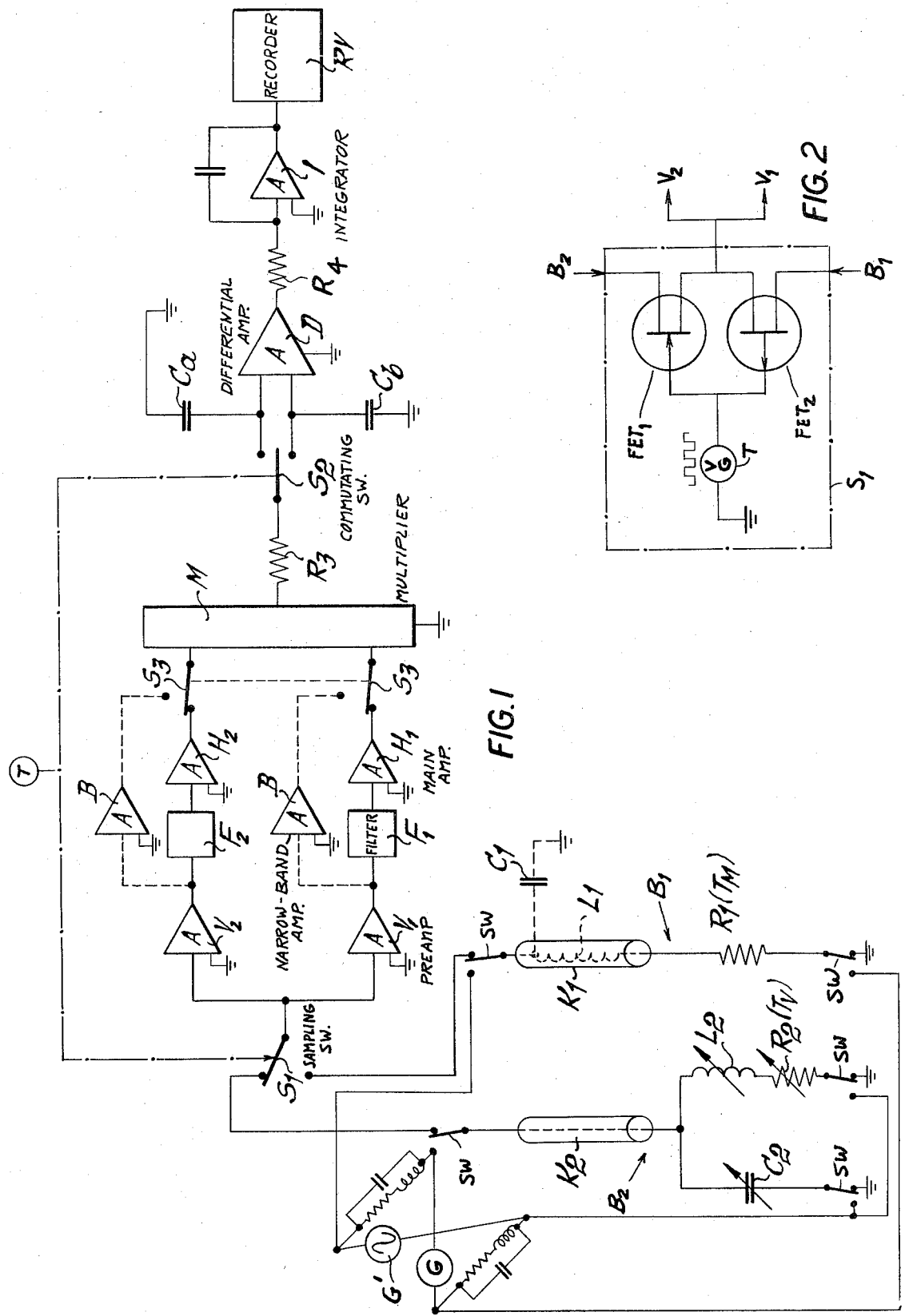

SYSTEM FOR MEASURING TEMPERATURES

CROSS-REFERENCE TO RELATED APPLICATION

This application is related to the concurrently filed commonly assigned copending U.S. Pat. application Ser. No. 238,834, filed by one of the present joint applicants.

FIELD OF THE INVENTION

Our invention relates to a system for measuring temperatures using the thermally generated noise voltage produced in a metallic conductor as a function of temperature and, more particularly, to a noise-voltage temperature-measurement system.

BACKGROUND OF THE INVENTION

A number of temperature-measuring systems have been proposed heretofore wherein thermal/electrical transducers are employed. Such systems make use of temperature-related electrical parameters of various devices. For example, in a thermocouple the metallic junction of two dissimilar metals produces an output in the millivoltage range when subjected to a temperature differential. Thermoresistive devices, on the other hand, become more or less conductive in accordance with the ambient temperature. There exist also systems in which thermoemission is detected in order to indicate temperature conditions or changes.

While the foregoing is not an exhaustive discussion of the various electrical parameters which have been used for temperature measurement, they have been described to distinguish between such resistive systems and systems in which a metallic strand, wire or film generates an electrical output by thermal agitation of electrical charges within the conductor. The output is a "noise voltage" and is produced in an electrical conductor by such thermal agitation. Thermal noise, also known as Johnson noise, can be produced in a conductor even at temperatures approaching 0° K and is particularly suitable for the measurement of temperature in the range of 0° to several 100° K. The available thermal-noise power is proportional to the resistance value of the conductor and is proportional to the absolute temperature and of course the frequency band width over which the noise is measured. With a fixed band width, the available thermal noise power can be measured in terms of the noise voltage and is proportional to absolute temperature.

As already indicated, various temperature/electrical transducers are known for the measurement of temperatures in addition to the noise-voltage sensors mentioned above. In prior-art systems using sensors of the latter type, practical limitations have precluded widespread use. The systems have been prone to failure and frequently give an erroneous temperature measurement. In the earlier systems using thermally sensitive elements such as bimetallic switching device, resistance thermometers, thermistors or pyrometers, various problems have been encountered. Firstly, the sensing element has only a limited range of operability, i.e., can only be used for a narrow temperature range. Secondly many of the prior-art elements cannot readily be disposed at locations at which temperature sensing is required. For example, pyrometers cannot effectively be incorporated in a wall without an appropriate window, while resistance elements are sensitive to high pressure, intensive radiation (e.g. as may develop in a nuclear-reactor core), and to high temperatures in the range of several 1,000° K. In general they have insufficient accuracy in the range of temperatures slightly above 0° to 3,000° K.

OBJECTS OF THE INVENTION

It is, therefore, an important object of the present invention to provide a temperature-measurement system which may be used within a relatively wide temperature spectrum (i.e., from somewhat above 0° K to about 3,000° K) with high accuracy and at relatively low cost.

It is another object of the invention to provide a temperature-measurement system which is less sensitive to environmental influences than prior-art devices.

More specifically, it is an object of the present invention to provide a temperature-measurement system which is less sensitive to the particular atmosphere in which the sensing element is disposed, is substantially unaffected by radiation of the character described and is substantially uninfluenced by pressure.

Yet another object of the invention is to provide a temperature-measuring system which is independent of the material from which the sensor is constituted and its mechanical and thermal treatments.

A more general object of the invention is to provide a highly versatile temperature-measurement system which avoids the aforedescribed difficulties and provides, at low cost, a highly accurate indication of temperature, free from external influences and within a relatively wide temperature range.

SUMMARY OF THE INVENTION

These objects and others which will become apparent hereinafter are attained, in accordance with the present invention, in a noise-voltage temperature measuring system comprising a noise-voltage temperature sensor, a preamplifier circuit connected to this sensor, a multiplier for forming an algebraic product of the amplified output of the sensor and a reference signal, and an output network including an amplifier arrangement for feeding a temperature indicator or display circuit. According to the invention, the reference signal is generated by a reference resistor. A sampling gate or switch arrangement alternately applies the outputs of the measuring resistor and the reference resistor to the multiplier as alternately derived from the respective amplifier chains.

According to the present invention, therefore, the system comprises a noise-voltage measuring resistor and a reference resistor alternately connected through preamplifier branches to a sampling gate or switch which is synchronized with an output sampling gate or switch for commutating the output of the multiplier to two inputs having respective capacitors (signal-storing condensers of a differential amplifier which may be connected through an analog integrating amplifier, operating also as a signal inverter, and supplying the output or temperature-indicating circuit. This circuit has been found to be highly desirable because the intrinsic noise of the amplifier branches is canceled or so reduced that the measurement precision is markedly increased.

In addition, we prefer to provide the reference resistance with an adjustable resistor, an adjustable capacitor and an adjutable inductor by means of which the inductance, resistance and inductance of the sensing resistor and its connecting line may be matched. The system has been found to be highly simple, free from breakdown and capable of long-term use with a minimum of repair of supervision.

According to the present invention at least the first switching means (connecting the sensing resistor and the reference resistor via the preamplifier branches with the multiplier) is constituted as a sampling gate having two alternately conducting field-effect transistors (FETs) and provided with a triggering input for the sampling. The output or second switch means, according to the invention, may likewise be constituted as a sampling gate with such field-effect transistors and is synchronized with the first sampling gate by the use of a common trigger for both.

The use of field-effect transistors as switching devices has the significant advantage in that the breakdown rate of the apparatus is substantially reduced and a maximum utilization of the noise voltage of the sensing resistor is obtained. It should be noted that electromechanical switches have a tendency to change operating characteristics with age and are provided with contact resistances which are seldom constant. The resistances constituted by the field-effect transistors are much smaller than the measuring resistances and the reference resistances, thereby increasing the precision of the system.

According to another feature of the invention, each of the preamplifier branches comprises a preamplifier stage connected directly to the output side of the sampling gate and in parallel to one another, and a filter responsive to the selected frequency band of the noise voltage. The filters then feed main amplifiers whose outputs are supplied to the multiplier. For further calibration of the resistance, capacitance and inductance of the reference-resistance range to bring about matching of these parameters with those of the measuring resistance, we provide narrow-band amplifiers with a band width within the measurement-frequency range of 500 kHz to 2 MHz, i.e., the narrow-band width of about 20kHz to 50kHz, the narrow-band amplifier being switched to shunt the filter and main amplifier of each amplification band by a manually operated pair of interconnected switches. Of course, we may compare and balance the resistance, inductance and capacitance of the reference branch and the sensing branch, including the respective parameters of the cables connecting these branches to the sampling switch, by a conventional measuring bridge of the wheatstone bridge, capacitance bridge or inductance bridge type, using alternating-current energization.

DESCRIPTION OF THE DRAWING

The above and other objects, features and advantages of the present invention will become more readily apparent from the following description, reference being made to the accompanying drawing in which:

FIG. 1 is a circuit diagram illustrating the invention; and

FIG. 2 is a schematic of a sampling gate adapted to be used with the system of FIG. 1.

SPECIFIC DESCRIPTION

In FIG. 1 of the drawing, a temperature-responsive noise-voltage sensor in the form of a resistor $R_1$ subjected to a temperature $T_m$ has been shown in diagrammatic form connected on one side to ground and connected at its other end via a cable or line $K_1$ to one terminal of the first switching means or sampling gate $S_1$. The temperature sensor $R_1$ (whose electrical output may be represented as $R'_1$ subsequently), may be a thin platinum wire as described above but preferably is of the type described in the concurrently filed, commonly assigned copending U.S. Pat. application Ser. No. 238,834, and entitled TEMPERATURE-MEASURING INSTRUMENT. The inductance of the cable $K_1$ (and the sensor $R_1$) is represented at $L_1$ while the instrinsic or line capacitance of the measuring branch $B_1$ is represented at $C_1$.

A reference branch $B_2$ is provided abd includes a reference resistance $R_2$ (at temperature $T_v$) connected in series with an adjustable inductor $L_2$ and bridged by a parallel adjustable capacitor $C_2$, the adjustability of the elements $R_2$, $L_2$ and $C_2$ permitting matching of the ohmic, inductive and capacitive impedances of branch $B_2$ with branch $B_1$. The branch $B_2$ further includes a cable or lead $K_2$ to another terminal of the first switching means or sampling gate $S_1$.

As since in FIG. 2, the sampling gate $S_1$ may comprise a pair of field-effect transistors $FET_1$ and $FET_2$, here shown to be of opposite-conductivity types (n-type and p-type) so as to be energized by a common trigger T. The field-effect sammpling gate may be of the type described at pages 658 ff. of PULSE, DIGITAL AND SWITCHING WAVEFORMS, McGraw Hill Book Co., New York, 1965. The inputs from branch $B_2$ and $B_1$ are applied to the drains of the field-effect transistors $FET_1$ and $FET_2$, the commonly connected sources of which feed the preamplifier stages of the amplification networks. It will be apparent that the alternate polarity triggering pulses of the trigger-pulse generator T render the field-effect transistors alternately conductive to apply the measuring branch $B_1$ and the reference branch $B_2$ to the inputs of the respective amplifier chains $V_1$, $F_1$, $H_1$ and $V_2$, $F_2$ and $H_2$ respectively.

The amplifier branches each comprise a preamplifier $V_1$ or $V_2$, a filter $F_1$ or $F_2$ having a pass-band width of the portion of the noise-voltage spectrum which is desired for measurement, and a main amplifier $H_1$ or $H_2$.

The outputs of the main amplifier $H_1$ and $H_2$ are applied to the two inputs of a multiplier M through a pair of mechanically operated (manual) contacts of a switch $S_3$, the contacts being connected or for joint actuation. The contacts of switch $S_3$ are each of the single pole, double-throw type and can connect, in the alternative, the main amplifier of the respective amplifier branch or a calibration amplifier B to the multiplier.

The multiplied voltage output from multiplier M is applied through resistor $R_3$ a commutating switch $S_2$ to the integrating signal-storage capacitors $C_a$ and $C_b$. The sampling switch $S_1$ and the commutating switch $S_2$ (which may be constituted by a pair of field-effect transistors as described in connection with FIG. 2 but connected inversely) are synchronized, e.g. via the common trigger-pulse generator T so that the noise voltage signal attributed to the measurement branch $B_1$ is always applied to the capacitor $C_a$ while the multiplier signal attributable to the branch $B_2$ is always applied to capacitor $C_b$.

To increase the measuring precision, the capacitors are connected to respective inputs of a differential amplifier D which, in turn feeds an integrating amplifier I through a resistor $R_4$. The output of the integrator/inverter I is applied to a readout or recording device represented at RV. The latter device may be a pen recorder, a dial or other conventional readout apparatus. With the switch $S_1$ and $S_3$ in the position shown in FIG. 1, the measuring signal from branch $B_1$ and the reference output of branch $B_2$ are applied alternately to both amplifier chains $V_1, \ldots V_2, \ldots$ and thus to the multiplier M by which in connection with $R_3$ and $C_a$, $C_b$ the intrinsic amplifier noise and like spurious signals are eliminated so that the output of multiplier M on $C_a$ respectively $C_b$ represents the noise voltage only. From time to time, or at the commencement of operation, the inductivity and the capacity of the connecting cable of branch $B_1$ may be minimized by manually operating switch $S_3$ to apply the narrow-band amplifiers to the circuits and adjusting the capacity of condenser $C_2$ and the inductivity of inductance $L_2$ for balance. The temperature, of course, can be given by the relationship $$T_m \approx R_2 T_v/R_1$$

where $T_m$ is the temperature of the measuring resistor $R_1$ in °K, $T_v$ is the temperature in °K of the reference resistor $R_2$.

FIG. 1 also shows a set of switches $S_b$ adapted to be manually operated to connect the measuring branch $B_1$ and the reference branch $B_2$ in a balancing bridge circuit with a galvanometer G and a supply-current source $G'$ for the setting of the variable capacitor $C_2$, the inductor $L_2$ etc. in the event the amplifiers B are not to be used.

We claim:

1. A system for the measurement of temperature comprising a measuring resistance having a thermally generated noise-voltage output; a reference resistance; a pair of amplifier branches; a sampling switch for alternately connecting each of said resistances to both of said amplifier branches in parallel; a multiplier connected to the outputs of said amplifier branches; a pair of means for alternately integrating the output of said multiplier in synchronism with said sampling switch; and output means connected to both of said integrating means for indicating, in response to a signal therefrom, a temperature detected by said measuring resistance.

2. A system for the measurement of temperature comprising a measuring resistance having a thermally generated noise-voltage output; a reference resistance; a pair of amplifier branches; a sampling switch for alternately connecting each of said resistances to both of said amplifier branches in parallel; a multiplier connected to the outputs of said amplifier branches; and output means connected to said multiplier for indicating, in response to a signal therefrom, a temperature detected by said measuring resistance, said sampling switch comprising a pair of alternately conductive field-effect transistors respectively connected to said measuring resistance and said reference resistance, and a trigger-pulse generator connected to said field-effect transistors for rendering same alternately conductive.

3. The system defined in claim 2 wherein said field-effect transistors have ohmic resistances less than that of said measuring resistance and said reference resistance.

4. A system for the measurement of temperature comprising a measuring resistance having a thermally generated noise-voltage output; a reference resistance; a pair of amplifier branches; a sampling switch for alternately connecting each of said resistances to both of said amplifier branches in parallel; a multiplier connected to the outputs of said amplifier branches, and output means connected to said multiplier for indicating, in response to a signal therefrom, a temperature detected by said measuring resistance, said measuring resistance being connected in a measuring branch having an effective inductance and capacitance, further comprising an adjustable capacitor and adjustable inductor in circuit with said reference resistance for balancing the effective capacitance and effective inductance respectively of said measuring branch.

5. The system defined in claim 4 wherein each of said amplifier branches has an effective equivalent range of about 500 kHz to 2 MHz, further comprising a manually operable switch between said amplifier branches and said multiplier, and respective narrow-band amplifiers with a band width of 20 kHz to 50 kHz shunting at least part of each of said amplifier branches and connected to said manually operable switch having contacts mechanically coupled for joint operation for connecting each amplifier branch to the multiplier in one switch position and for connecting the respective narrow-band amplifiers to said multiplier in another switch position.

6. The system defined in claim 3, further comprising switch means for connecting said measuring branch and said reference resistance together with said capacitor and said inductor in a bridge circuit adapted to be balanced for adjustment of said inductor and said capacitor.

7. A system for the measurement of temperature comprising a measuring resistance having a thermally generated noise-voltage output; a reference resistance; a pair of amplifier branches; a sampling switch for for alternately connecting each of said resistances to both of of said amplifier branches in parallel; a multiplier connected to the outputs of said amplifier branches; and output means connected to said multiplier for indicating, in response to a signal therefrom, a temperature detected by said measuring resistance, said output means including a respective storage capacitor assigned to each of said resistances, a differential amplifier connected to said storage capacitors, and a commutating switch between said multiplier and said storage capacitors and synchronized with said sampling switch.

8. The system defined in claim 7 wherein said output means further comprises an integrator circuit connected to the output of a differential amplifier and a temperature resistor connected to the output of said integrator circuit.

9. The system defined in claim 8 wherein said amplifier branches each include a preamplifier connected to said sampling switch, respective noise-voltage passing filters connected to said preamplifiers, and respective main amplifiers connected to each of said filters and feeding respective signals to said multiplier.

10. The system defined in claim 9 wherein each of said switches is constituted by a pair of field-effect transistors.

* * * * *